United States Patent
Lee et al.

(10) Patent No.: US 11,170,481 B2
(45) Date of Patent: Nov. 9, 2021

(54) DIGITAL FILTER FOR FILTERING SIGNALS

(71) Applicant: Etron Technology, Inc., Hsinchu (TW)

(72) Inventors: Chi-Feng Lee, Hsinchu County (TW);
Sih-Sian Wu, Kaohsiung (TW);
Liang-Gee Chen, New Taipei (TW)

(73) Assignee: Etron Technology, Inc., Hsinchu (TW)

( * ) Notice: Subject to any disclaimer, the term of this patent is extended or adjusted under 35 U.S.C. 154(b) by 61 days.

(21) Appl. No.: 16/540,081

(22) Filed: Aug. 14, 2019

(65) Prior Publication Data

US 2020/0058114 A1    Feb. 20, 2020

Related U.S. Application Data

(60) Provisional application No. 62/718,949, filed on Aug. 14, 2018.

(51) Int. Cl.
*G06T 5/50* (2006.01)
*G06T 7/593* (2017.01)
(Continued)

(52) U.S. Cl.
CPC ............ *G06T 5/50* (2013.01); *G06F 17/18* (2013.01); *G06T 5/002* (2013.01); *G06T 7/593* (2017.01);
(Continued)

(58) Field of Classification Search
CPC .. G06T 5/50; G06T 5/002; G06T 5/40; G06T 5/003–009; G06T 5/20; G06T 7/593; G06T 2207/20182; G06T 2207/10012; G06T 2207/20084; G06T 2207/20208; G06T 2207/20221; G06T 2207/20024; G06T 1/20; G06T 1/60; G06T 3/4046; G06F 17/18; H04N 19/176; H04N 19/11;
(Continued)

(56) References Cited

U.S. PATENT DOCUMENTS 8,630,356 B2 * 1/2014 Zhang .................. H04N 19/117
375/240.29
8,797,616 B2 * 8/2014 Sugiura .................... H04N 1/64
358/523
(Continued)

OTHER PUBLICATIONS

"Two-Dimensional Block Adaptive Filtering Algorithms with Optimum Convergence Factors"; Wasfy B. Mikhael, IEEE Transactions on Circuits and Systems-11: Analog and Digital Signal Processing, vol. 42, No. 8, Aug. 1995 (Year: 1995).*

*Primary Examiner* — Michael S Osinski
(74) *Attorney, Agent, or Firm* — Winston Hsu

(57) ABSTRACT

A digital filter for filtering signals includes a processor and a memory. The processer receives a plurality of input signal values and a plurality of input aggregated values corresponding to the plurality of input signal values. The memory saves a signal value set and a statistical information set. The processer generates a check result according to the plurality of input signal values and the signal value set. The processer updates the statistical information set of the memory according to the check result, and decides whether to insert at least one new signal value into the signal value set of the memory, wherein the processer generates an output value according to the signal value set and the statistical information set of the memory.

10 Claims, 13 Drawing Sheets

(51) Int. Cl.
*G06F 17/18* (2006.01)
*G06T 5/00* (2006.01)

(52) U.S. Cl.
CPC ............ *G06T 2207/10012* (2013.01); *G06T 2207/20182* (2013.01)

(58) Field of Classification Search
CPC ...... H04N 19/46; H04N 19/463; H04N 19/70; H04N 19/117; H04N 19/159; H04N 19/82; H04N 19/172–174; H04N 19/18; H04N 19/593; H04N 19/60; H04N 19/86
See application file for complete search history.

(56) References Cited

U.S. PATENT DOCUMENTS

| | | | | |
|---|---|---|---|---|
| 2010/0046851 A1* | 2/2010 | Inoue | | G06T 3/4007 382/260 |
| 2010/0278422 A1* | 11/2010 | Iketani | | H04N 9/646 382/165 |
| 2012/0288193 A1* | 11/2012 | Hatakeyama | | H04N 5/35721 382/167 |
| 2012/0321214 A1* | 12/2012 | Hosokawa | | G06T 3/4007 382/263 |
| 2013/0028326 A1* | 1/2013 | Moriya | | H04N 19/107 375/240.16 |
| 2013/0038748 A1* | 2/2013 | Hatakeyama | | G06T 5/003 348/222.1 |
| 2013/0088613 A1* | 4/2013 | Kanto | | H04N 1/6027 348/223.1 |
| 2013/0141611 A1* | 6/2013 | Hirai | | H04N 5/357 348/231.3 |
| 2013/0182757 A1* | 7/2013 | Karczewicz | | H04N 19/13 375/240.02 |
| 2013/0342732 A1* | 12/2013 | Yokoyama | | G06T 5/003 348/231.99 |
| 2014/0247875 A1* | 9/2014 | Hattori | | H04N 19/176 375/240.12 |
| 2014/0362926 A1* | 12/2014 | Rosewarne | | H04N 19/119 375/240.18 |
| 2015/0049215 A1* | 2/2015 | Kuang | | H04N 5/2355 348/231.6 |
| 2015/0161773 A1* | 6/2015 | Takahashi | | H04N 5/272 382/173 |
| 2015/0244915 A1* | 8/2015 | Kikuchi | | H04N 5/23251 348/234 |
| 2015/0254822 A1* | 9/2015 | Levy | | G06T 5/20 382/264 |
| 2015/0348506 A1* | 12/2015 | Ooga | | G09G 5/02 345/205 |
| 2016/0124209 A1* | 5/2016 | Arai | | H04N 7/183 348/80 |
| 2017/0061897 A1* | 3/2017 | Zhang | | G09G 3/3426 |
| 2017/0251194 A1* | 8/2017 | Plank | | H04N 13/15 |
| 2018/0198977 A1* | 7/2018 | Okumura | | H04N 5/3572 |
| 2018/0249141 A1* | 8/2018 | Moriya | | G06T 5/008 |
| 2018/0268530 A1* | 9/2018 | Worthington | | G06T 5/40 |
| 2018/0322614 A1* | 11/2018 | Petrova | | G06T 5/20 |
| 2019/0124339 A1* | 4/2019 | Young | | H04N 19/159 |
| 2019/0156516 A1* | 5/2019 | Nikkanen | | G06T 5/50 |
| 2019/0289331 A1* | 9/2019 | Byun | | H04N 19/82 |
| 2019/0313121 A1* | 10/2019 | Eshima | | H04N 19/103 |
| 2019/0371226 A1* | 12/2019 | Iwaki | | G11C 11/54 |
| 2019/0373258 A1* | 12/2019 | Karczewicz | | H04N 19/463 |
| 2020/0014956 A1* | 1/2020 | Rosewarne | | H04N 19/61 |
| 2020/0021805 A1* | 1/2020 | Ko | | H04N 19/46 |
| 2020/0275124 A1* | 8/2020 | Ko | | H04N 19/11 |
| 2020/0364829 A1* | 11/2020 | Ahn | | G06K 9/6232 |
| 2020/0372608 A1* | 11/2020 | Lee | | G06T 7/13 |
| 2021/0006796 A1* | 1/2021 | Tsukuba | | H04N 19/176 |
| 2021/0021818 A1* | 1/2021 | Lee | | H04N 19/82 |
| 2021/0042616 A1* | 2/2021 | Furukawa | | G06F 7/00 |
| 2021/0092458 A1* | 3/2021 | Seregin | | H04N 19/82 |

* cited by examiner

| Input signal value | Input aggregated value |
|---|---|
| 1 | 4 |
| 3 | 1 |
| 2 | 2 |

| Input signal value | Input aggregated value |
|---|---|
| 1 | 1 |
| 3 | 0 |

| Signal value set | Aggregated value set | Difference value set | | | |
|---|---|---|---|---|---|
| 1 | 9 | 35 | -4 | +1 | +2 |
| 3 | 16 | 15 | -4 | +1 | -2 |
| 4 | 20 | -20 | -4 | -1 | -2 |
| 2 | 2 | $-9+16+20$ | | | |

Corresponding to input signal value 1
Corresponding to input signal value 3
Corresponding to input signal value 2

| Signal value set | Aggregated value set | Difference value set |
|---|---|---|
| 1 | 9 | 38 |
| 3 | 16 | 9 |
| 4 | 20 | -27 |
| 2 | 2 | 27 |
| ... | ... | ... |

FIG. 10C

DIGITAL FILTER FOR FILTERING SIGNALS

CROSS REFERENCE TO RELATED APPLICATIONS

This application claims the benefit of U.S. Provisional Application No. 62/718,949, filed on Aug. 14, 2018 and entitled "Memory Efficient Weighted Mode/Median Filter Design for Depth Refinement", the contents of which are incorporated herein by reference.

BACKGROUND OF THE INVENTION

1. Field of the Invention

The present invention relates to a digital filter for filtering signals, and particularly to a digital filter for filtering signals that can enhance memory saving efficiency.

2. Description of the Prior Art

In the prior art, when a filter filters a signal to enhance quality of the signal, the filter first selects a target datum from the signal, and decides an input window corresponding to the target datum according to the target datum, wherein the input window corresponds to a plurality of data of the signal, and the plurality of data have a plurality of signal value. The filter further utilizes a memory to save an aggregated data amount corresponding to each signal value, wherein the aggregated data amount can be seen as a weight coefficient of the filter. For example, when the each signal value is represented by an 8-bit number, the each signal value can be any value from 0 to 255. Meanwhile, the memory can provide 256 memory cells in advance to save aggregated data amount corresponding to signal values of 0 to 255. The filter can generate a signal value corresponding to the input window to replace an original signal value of the target datum according to an aggregated data amount corresponding to the each signal value. By selecting each datum of the signal as the target datum and repeating the above-mentioned operation, the filter can filter noises of the signal. However, because the plurality of data would have same or similar signal values in most cases, only a few memory cells of the memory would have non-zero aggregated data amount, resulting in saving efficiency of memory being poor. Therefore, how to enhance the saving efficiency of the memory is an important issue for a filter designer.

SUMMARY OF THE INVENTION

An embodiment of the present invention provides a digital filter for filtering signals. The digital filter includes a processer and a memory. The processer receives M input signal values and M input aggregated values corresponding to the M input signal values, wherein M is a positive integer. The memory is coupled to the processer for saving a signal value set and a statistical information set, wherein the processer optionally updates the signal value set and the statistical information set according to the M input signal values and the M input aggregated values, and generates an output value according to the updated signal value set and the updated statistical information set, wherein a number of signal values in the updated signal value set is less than M.

Another embodiment of the present invention provides a digital filter for filtering signals. The digital filter includes a processer and a memory. The processer receives M input signal values and M input aggregated values corresponding to the M input signal values, wherein each input signal values is an N-bits data, and M, N are positive integers. The memory is coupled to the processer for saving a signal value set and a statistical information set, wherein the processer optionally updates the signal value set and the statistical information set according to the M input signal values and the M input aggregated values, and generates an output value according to the updated signal value set and the updated statistical information set, wherein a number of signal values in the updated signal value set is less than $2^N$, and the number of signal values is less than or equal to M.

Another embodiment of the present invention provides a digital filter for filtering signals. The digital filter includes a processer and a memory. The processer receives a plurality of input signal values and a plurality of input aggregated values corresponding to the plurality of input signal values. The memory is coupled to the processer for saving a signal value set and a statistical information set, wherein the processer generates a check result according to the plurality of input signal values and the signal value set, the processer updates the statistical information set of the memory according to the check result, and decides whether to insert at least one new signal value into the signal value set of the memory, wherein the processer generates an output value according to the signal value set and the statistical information set of the memory.

Another embodiment of the present invention provides a digital filter for filtering signals. The digital filter includes a processer and a memory. The processer batchwise receives a plurality of input signal values and a plurality of input aggregated values corresponding to the plurality of input signal values according to a predetermined order. The memory is coupled to the processer for saving a trace set and a statistical information set, wherein the processer generates a check result according to a part of the plurality of input signal values and the trace set in each batch, when a number of statistical information in the statistical information set of the memory is less than a predetermined value K, the processer updates the statistical information set of the memory according to the check result, and decides whether to insert at least one new trace value into the trace set of the memory, wherein K is a positive integer. When the number of statistical information in of the statistical information set of the memory equals to the predetermined value K, (1) the processer generates a first output value according to the trace set and the statistical information set of the memory; or (2) after the processer continues updating the statistical information set of the memory according to each check result of remaining batches, the processer generates a second output value according to the trace set and the statistical information set of the memory; or (3) after the processer continues optionally replacing the trace set and the statistical information set according to the each check result of the remaining batches and a compare result, the processer generates a third output value according to the trace set and the statistical information set of the memory.

Another embodiment of the present invention provides a digital filter for filtering signals. The digital filter includes a processer and a memory. The processer receives a plurality of input signal values and a plurality of input aggregated values corresponding to the plurality of input signal values. The memory is coupled to the processer for saving a signal value set and a statistical information set, wherein the statistical information set comprises an aggregated value set and a difference value set, wherein the processer generates a check result according to the plurality of input signal values and the signal value set, and the processer updates the aggregated value set and the difference value set of the memory according to the check result, and decides whether to insert at least one new signal value into the signal value set of the memory, wherein the processer generates an output value according to the signal value set and the difference value set of the memory.

Another embodiment of the present invention provides a filter system. The filter system includes a depth map generator and a digital filter. The depth map generator generates a depth map according to a left-eye image and a right-eye image. The digital filter generates a plurality of input signal values and a plurality of input aggregated values corresponding to the plurality of input signal values at least according to the depth map, and saves a signal value set and a statistical information set, wherein the digital filter further generates a check result according to the plurality of input signal values and the signal value set, updates the statistical information set according to the check result, decides whether to insert at least one new signal value into the signal value set, and generates an output value according to the signal value set and the statistical information set.

Because a memory included in the digital filter provided by the present invention utilizes a signal value set and an aggregated value set of at least one statistical information set corresponding to the signal value set to save a signal value and an aggregated value of each datum of an input window corresponding to a target datum, the present invention can enhance saving efficiency of the memory. In addition, because the at least one statistical information set further includes a difference value set, the present invention can calculate and output a corresponding signal value to replace an original signal value of the target datum according to the signal value set and one of the aggregated value set and the difference value set. Therefore, the digital filter not only provides different filter effect, but also enhances saving efficiency of the memory.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 10A-10C are diagrams illustrating an operation method of the difference value updater.

DETAILED DESCRIPTION

Figure 1:
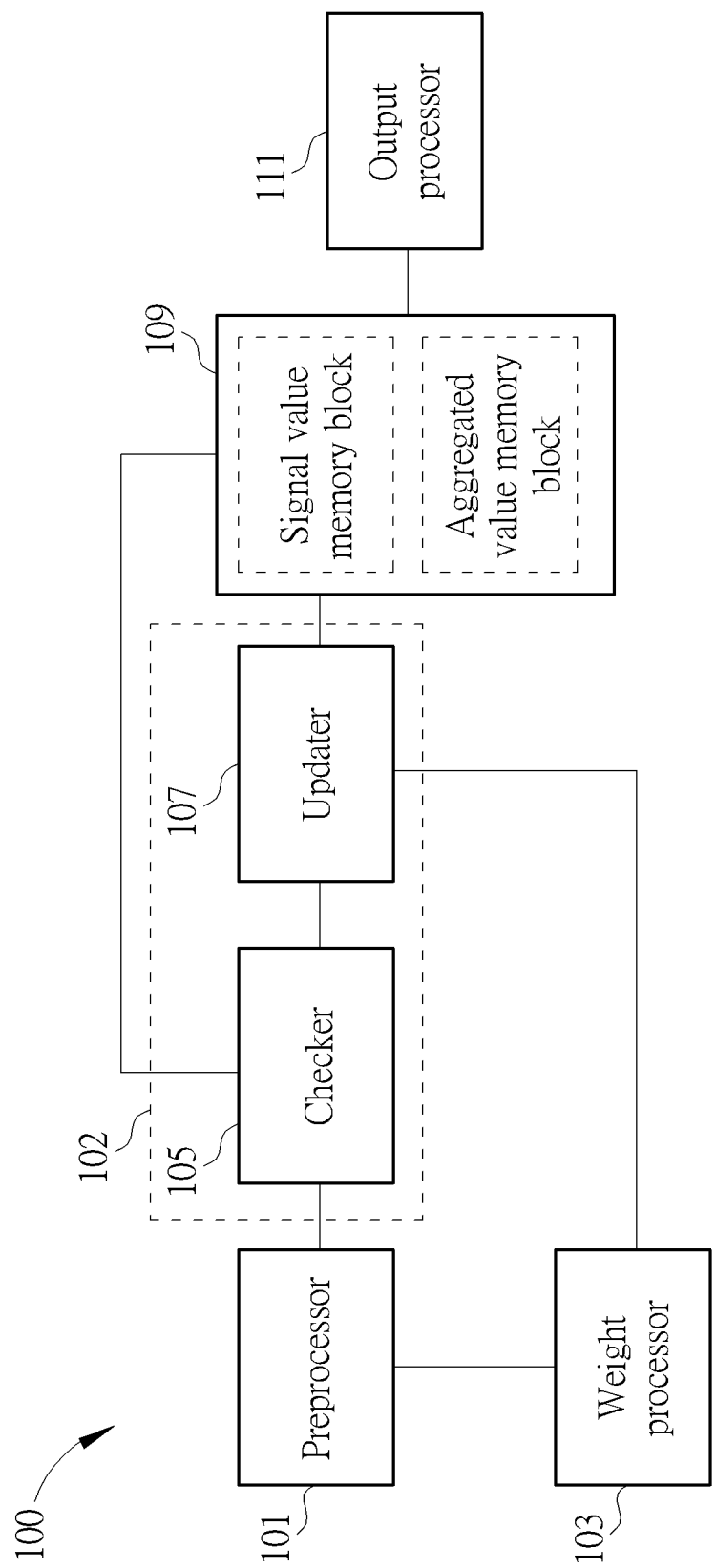
FIG. 1 is a diagram illustrating a digital filter for filtering signals according to a first embodiment of the present invention.

Please refer to FIG. 1. FIG. 1 is a diagram illustrating a digital filter 100 for filtering signals according to a first embodiment of the present invention. As shown in FIG. 1, the digital filter 100 includes a preprocessor 101, a weight processor 103, a checker 105, an updater 107, a memory 109, and an output processor 111. In this embodiment of the present invention, the checker 105 and the updater 107 can be integrated to a processor 102, wherein the processer 102 has all functions of the checker 105 and the updater 107. In other embodiments of the present invention, the checker 105 and the updater 107 also can be independent circuits. The preprocessor 101 is used for receiving a plurality of data corresponding to an input window of a signal (e.g. L data, wherein L is a positive integer), the plurality of data are used for filtering a target datum corresponding to the input window, and each data of the plurality of data has a signal value, wherein a signal value of the each data is represented by N bits, and N is a positive integer. For example, when the signal is a depth map DI, the preprocessor 101 is used for receiving a plurality of pixels of the depth map DI corresponding to an input window IW (shown in FIG. 2), wherein the input window IW corresponds to a target pixel TP. Subsequent operation methods of the present invention are described by the signal being the depth map DI. But, the present invention is not limited to the signal being the depth map DI, that is, the signal can be other types of signals.

Figure 2:
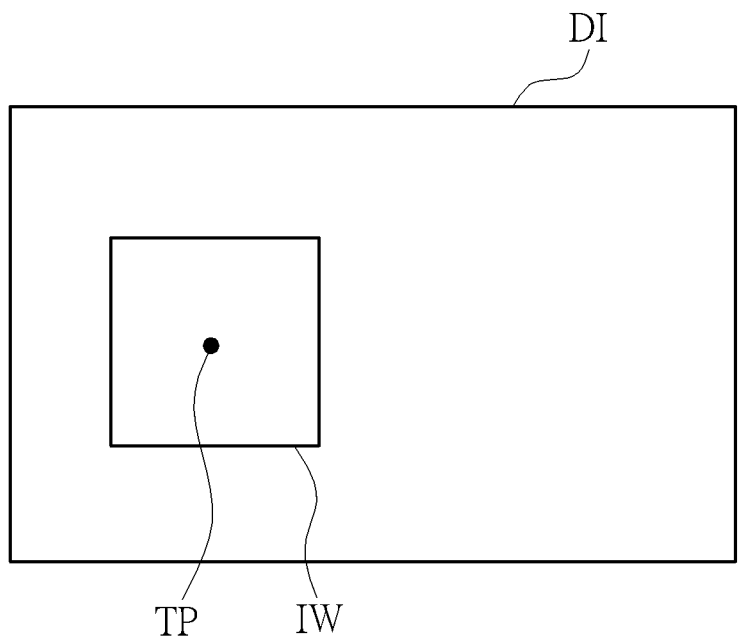
FIG. 2 is a diagram illustrating the depth map and the input window.

Please refer to FIG. 2. FIG. 2 is a diagram illustrating the depth map DI and the input window IW. As shown in FIG. 2, the digital filter 100 can select the target pixel TP from the depth map DI, and decide the input window IW according to the target pixel TP. So, the target pixel TP is one of the plurality of pixels of the depth map DI corresponding to the input window IW, wherein each pixel of the plurality of pixels has a signal value. Because the present invention is described by the signal being the depth map DI, the signal value of the each pixel of following embodiments is depth information, wherein the depth information can be a disparity value or a distance. But, the present invention is not limited to the signal being the depth map DI, so the present invention is also not limited to the signal value of the each pixel being the disparity value or the distance. That is, the signal value of the each pixel can be a gray-level image value or other signal values corresponding to a format of the signal. In addition, because the present invention is not limited to the signal being the depth map DI, the present invention is also not limited to the input window IW being the format shown in FIG. 2. That is, the input window IW can be other format for marking specific data of the signal. For example, when the signal is in 1-dimension format, the input window IW can be a marking method to mark specific bits of the signal. As shown in FIG. 2, the target pixel TP is in a center of the input window IW. But, the present invention is not limited to the target pixel TP being in the center of the input window IW. That is, the target pixel TP can be at any position of the input window IW. In addition, the present invention is also not limited to the input window IW being a square shown in FIG. 2, that is, the input window IW can be a polygon or in other geometric shapes. In addition, when the target pixel TP approaches a boundary of the depth map DI, resulting in a part of the input window IW exceeding the boundary of the depth map DI, the preprocessor 101 can neglect pixels in the part of the input window IW. But, the present invention is not limited to the preprocessor 101 neglecting the pixels in the part of the input window IW when the part of the input window IW exceeds the boundary of the depth map DI. That is, when the part of the input window IW exceeds the boundary of the depth map DI, the preprocessor 101 can utilize other methods (e.g. zero-padding, replicate boundary, or interpolation) to process the pixels in the part of the input window IW, wherein the preprocessor 101 utilizing the other methods (e.g. zero-padding, replicate boundary or interpolation) to process the pixels in the part of the input window IW is well-known to those of ordinary skill in the art, so further description thereof is omitted for simplicity.

Figure 3A:
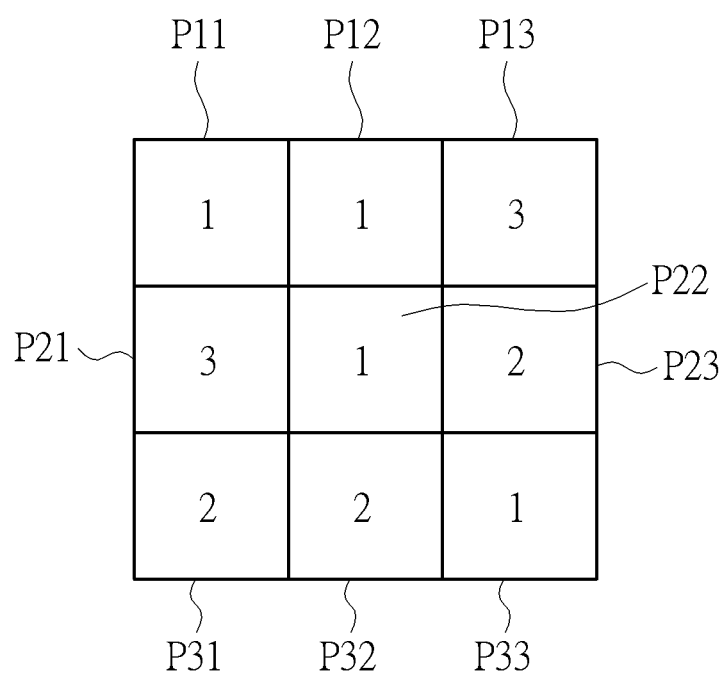
FIGS. 3A-3C are diagrams illustrating operation methods of the preprocessor and the weight processor.
Figures 3B, 3C:
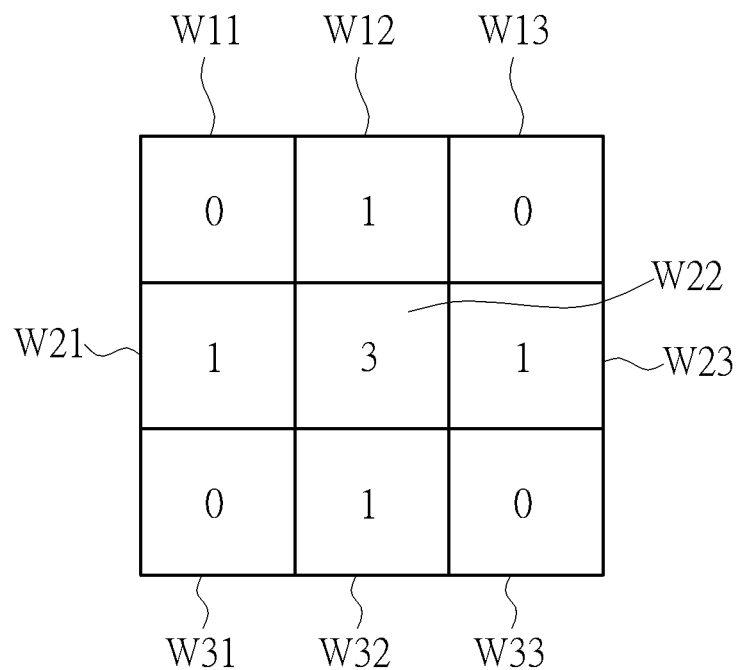
Figure 4A:
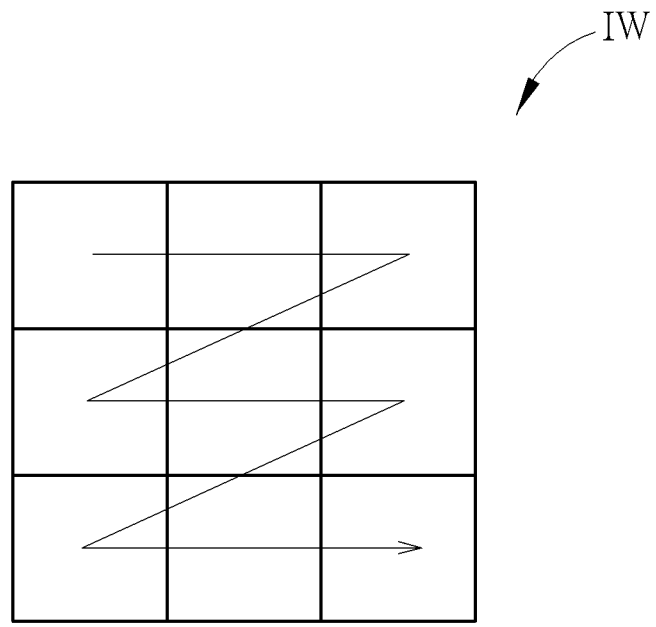
FIG. 4A is a diagram illustrating the preprocessor scanning the pixels in the raster scan order.
Figure 4B:
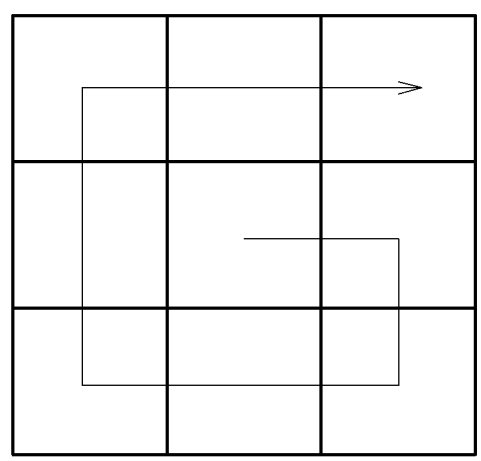
FIG. 4B is a diagram illustrating the preprocessor scanning the pixels in the non-raster scan order.

In addition, the preprocessor 101 can scan the plurality of pixels in order, and generate a plurality of input signal values corresponding to the input window IW in order according to signal values of the plurality of pixels (e.g. M input signal values, wherein M is a positive integer, and M is not greater than L), wherein because the signal values of the plurality of pixels is represented by N bits, the M input signal values also are N-bits data. For example, please refer to an example shown in FIGS. 3A-3C. FIGS. 3A-3C are described by a size of the input window IW being 3*3 and having pixels P11-P33, wherein the target pixel TP is the pixel P22, and a number of the each pixel is the signal value of the each pixel. But, the present invention is not limited to the size of input window IW being 3*3 and having the pixels P11-P33. The preprocessor 101 scans the pixels P11-P33 in order for obtaining signal values of the pixels P11-P33, and generates the plurality of input signal values corresponding to the input window IW in order according to the signal values of the pixels P11-P33, wherein the preprocessor 101 can scan the pixels P11-P33 in a raster scan order. Please refer to FIG. 4A. FIG. 4A is a diagram illustrating the preprocessor 101 scanning the pixels P11-P33 in the raster scan order, and the solid line in FIG. 4A depicts the raster scan order. But, the present invention is not limited to the raster scan order being an order shown in FIG. 4A. In addition, marks of the pixels P11-P33 are not shown in FIG. 4A for simplicity. As shown in FIGS. 3A, 4A, the preprocessor 101 can start to scan the signal values of the pixels P11-P33 from the pixel P11 according to the raster scan order, and obtain the signal values 1, 1, 3, 3, 1, 2, 2, 2, 1 corresponding to the pixels P11-P33. But, the present invention is not limited to the signal values corresponding to the pixels P11-P33 being 1, 1, 3, 3, 1, 2, 2, 2, 1. After the preprocessor 101 obtaining the above-mentioned signal values corresponding to the pixels P11-P33, because signal values 1, 2, 3 are scanned in an order of 1, 3, 2, the preprocessor 101 can generate input signal values 1, 3, 2 corresponding to the input window IW according to the order of 1, 3, 2 (as shown in FIG. 3C). But, in another embodiment of the present invention, the preprocessor 101 also can scan the pixels P11-P33 in a non-raster scan order, for example, a scan order in concentric circles or other scan orders. But, the present invention is not limited to the non-raster scan order being the order in concentric circles. Please refer to FIG. 4B. FIG. 4B is a diagram illustrating the preprocessor 101 scanning the pixels P11-P33 in the non-raster scan order, and the solid line in FIG. 4B describes the non-raster scan order. In addition, the marks of the pixels P11-P33 are also not shown in FIG. 4B for simplicity. As shown in FIGS. 3A, 4B, the preprocessor 101 can start to scan the signal values of the pixels P11-P33 from the pixel P22 according to the non-raster scan order, and obtain the signal values 1, 2, 1, 2, 2, 3, 1, 1, 3 corresponding to the pixels P11-P33. In This example, because signal values 1, 2, 3 are scanned in an order of 1, 2, 3, the preprocessor 101 can generate input signal values 1, 2, 3 corresponding to the input window IW according to the order of 1, 2, 3.

Figure 5:
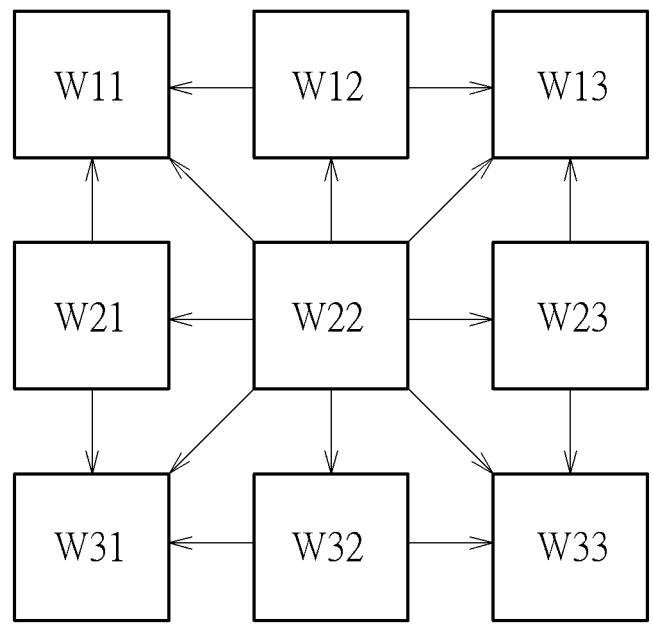
FIG. 5 is a diagram illustrating the weight processor adjusting the weights according to the adjusting order according to another embodiment of the present invention.

In addition, the weight processor 103 is coupled to the preprocessor 101 and is used for deciding a plurality of weights corresponding to the plurality of pixels (e.g. L weights corresponding to L pixels). A weight corresponding to the each pixel is decided by searching a look-up table. But, in another embodiment of the present invention, the weight corresponding to the each pixel is decided by calculating an absolute difference between a signal value of the each pixel and a signal value of the target pixel TP, a geometric distance between the each pixel and the target pixel TP, or both the absolute difference and the geometric distance, wherein when the absolute difference is greater, the weight corresponding to the each pixel is lesser. As shown in FIG. 3B, weights W11-W33 correspond to the pixels P11-P33, respectively, wherein the weights W11-W33 are 0, 1, 0, 1, 3, 1, 0, 1, 0, respectively. But, the present invention is not limited to the weights W11-W33 being 0, 1, 0, 1, 3, 1, 0, 1, 0, respectively. In addition, in another embodiment of the present invention, the weight processor 103 can further adjust each weight according to an adjusting order. Please refer to FIG. 5. FIG. 5 is a diagram illustrating the weight processor 103 adjusting the weights W11-W33 according to the adjusting order. The adjusting order starts from a target weight (that is, the weight W22) corresponding to the target pixel TP (that is, the pixel P22) and sorts outer weights of the weight W22 in order. For example, the adjusting order can be weights W22, W12, W23, W32, W21, W13, W33, W31, and W11 in order. But, the above-mentioned order is only for example, and the present invention is not limited to the adjusting order being the above-mentioned order. In addition, arrows shown in FIG. 5 can represent whether the each weight is used for adjusting another weight. For example, an arrow from the weight W22 to the weight W11 represents that the weight W22 is used for adjusting the weight W11. Similarly, the weight W12 and the weight W21 are also used for adjusting the weight W11. But, the present invention is also not limited to the weights W11-W33 being adjusted as the arrows shown in FIG. 5. Moreover, when the weight processor 103 utilizes the weights W12, W22, W21 to adjust the weight W11, the weight processor 103 can adjust the weight W11 according to equation (1):

$$W11 = \min(W11, \max(W12, W22, W21)) \quad (1)$$

According to equation (1), the weight W11 is limited by a maximum value among the weights W12, W22, W21. That is, when the weight W11 is greater than the maximum value among the weights W12, W22, W21, the weight W11 would be adjusted to the maximum value. But, in another embodiment of the present invention, the weights W11-W33 can be represented in binary bits (such as 0 and 1). Therefore, the weight processor 103 can adjust the weight W11 according to equation (2):

$$W11 = \text{and } (W11, \text{ or } (W12, W22, W21)) \quad (2)$$

In addition, the weight processor 103 can adjust each weight of the weights W11-W33 except for the target weight (that is, weight W22) according to the weight processor 103 adjusting the weight W11. As shown in FIG. 5, because the weight processor 103 can adjust the each weight of the weights W11-W33 except for the target weight, when the depth map DI includes at least two objects, the above-mentioned adjustment of the weight processor 103 can enhance ability of the digital filter 100 to distinguish an object corresponding to the target pixel TP and other objects (different from the object corresponding to the target pixel TP) of the at least two objects. In addition, in another embodiment of the present invention, the weight processor 103 further can decide the weight corresponding to the each pixel according to other kinds of signals corresponding to the each pixel. For example, the weight processor 103 can decide the weight corresponding to the each pixel according to a gray-level image value corresponding to the each pixel. In addition, in another embodiment of the present invention, the weight processor 103 can execute following calculations according to the signal value of the each pixel without generating the weight corresponding to the each pixel. That is, meanwhile the weight corresponding to the each pixel is set to 1).

Please again refer to FIG. 3C. After the weight processor 103 decides the weights W11-W33, the weight processor 103 can aggregate weights corresponding to pixels having the input signal value 1 (that is, weights 0, 1, 3, 0 corresponding to the pixels P11, P12, P22, P33) to generate an input aggregated value 4 corresponding to the input signal value 1, that is, input aggregated value 4=0+1+3+0. Similarly, the weight processor 103 can aggregate the weights W13, W21 corresponding to the pixels P13, P21 (wherein the pixels P13, P21 have the input signal value 3) to generate an input aggregated value 1 corresponding to the input signal value 3 (wherein the input aggregated value 1=0+1), and aggregate the weights W23, W31, W32 corresponding to the pixels P23, P31, P32 (wherein the pixels P23, P31, P32 have the input signal value 2) to generate an input aggregated value 2 corresponding to an input signal value 2 (wherein the input aggregated value 2=1+0+1).

Figure 6A:
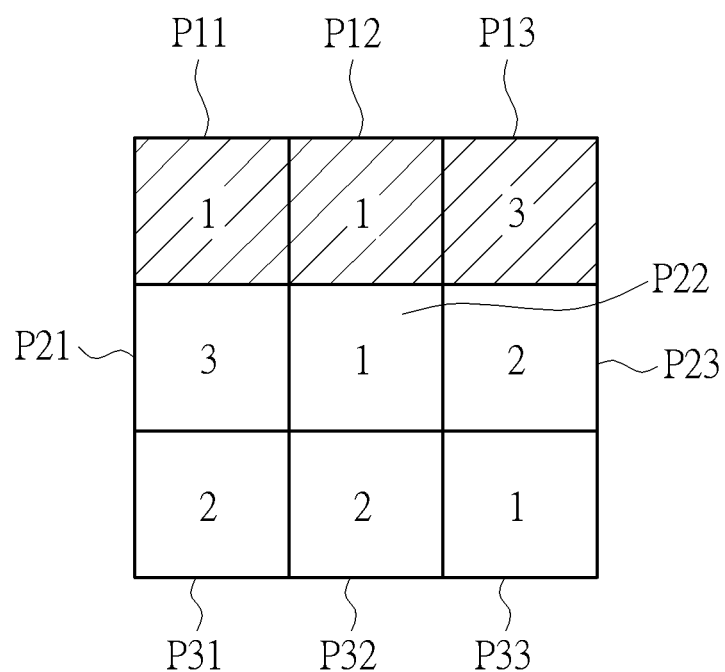
FIGS. 6A-6C are diagrams illustrating operation methods of the preprocessor and the weight processor according to another embodiment of the present invention.
Figures 6B, 6C:
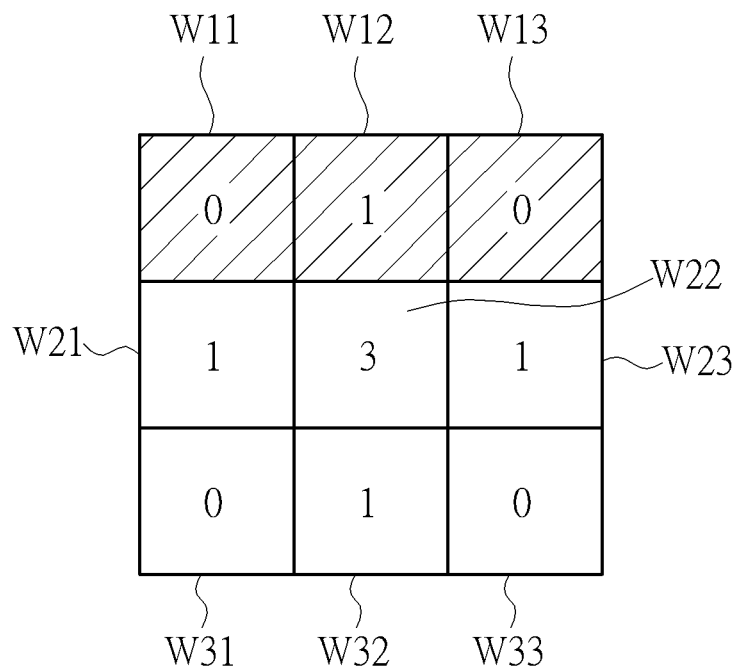

Please refer to FIGS. 6A-6C. FIGS. 6A-6C are diagrams illustrating the preprocessor 101 and the weight processor 103 generating the plurality of input signal values and a plurality of input aggregated values according to another embodiment of the present invention, wherein FIGS. 6A-6C are described by the pixels P11-P33 and the weights W11-W33 shown in FIGS. 3A-3C. As shown in FIG. 6A, the preprocessor 101 can batchwise divide the pixels P11-P33 into a plurality of blocks and selects the plurality of blocks according to a predetermined order. But, the present invention is not limited to the preprocessor 101 dividing the pixels P11-P33 as shown in FIG. 6A. That is, the preprocessor 101 can arbitrarily divide the pixels P11-P33 into the plurality of blocks, wherein the each block of the plurality of blocks includes at least one pixel. In FIGS. 6A-6B, the preprocessor 101 can select a block corresponding to the pixels P11-P13, wherein a selected block is marked in slashes. The preprocessor 101 and the weight processor 103 generate input signal values corresponding to the selected block and input aggregated values corresponding to the selected block according to the selected block. Because the preprocessor 101 and the weight processor 103 operate according to the selected block, the preprocessor 101 only generates input signal values 1, 3 and the weight processor 103 only generates input aggregated values 1, 0 corresponding to the input signal values 1, 3 shown in FIG. 6C, wherein an operation method of the preprocessor 101 generating the input signal values 1, 3 and the weight processor 103 generating the input aggregated values 1, 0 corresponding to the input signal values 1, 3 can be referred to the above-mentioned description of the preprocessor 101 and the weight processor 103 in FIGS. 3A-3C, so further description thereof is omitted for simplicity. In addition, after the preprocessor 101 generates the input signal values 1, 3 and the weight processor 103 generates the input aggregated values 1, 0 corresponding to the input signal values 1, 3, the preprocessor 101 can select another block different from the selected block to generate input signal values and input aggregated values corresponding to the another block. Therefore, by batchwise selecting the plurality of blocks according to the predetermined order, the preprocessor 101 and the weight processor 103 can batchwise generate a plurality of input signal values corresponding to the pixels P11-P33 and a plurality of input aggregated values corresponding to the pixels P11-P33.

In another embodiment of the present invention, the preprocessor 101 is a processor having the above-mentioned functions of the preprocessor 101 and the weight processor 103, and the weight processor 103 is used for receiving the plurality of input signal values and the plurality of input aggregated values, and providing a look-up table for searching of following operation methods of the digital filter 100. In addition, in another embodiment of the present invention, the weight processor 103 can be integrated to the preprocessor 101. Meanwhile the preprocessor 101 can execute the above-mentioned functions of the preprocessor 101 and the weight processor 103.

Please refer to FIG. 1 again. The checker 105 is coupled to the preprocessor 101, and the updater 107 is coupled to the checker 105 and the weight processor 103, wherein the checker 105 and the updater 107 are used for receiving the plurality of input signal values and the plurality of input aggregated values, respectively. The checker 105 further receives a signal value set from the memory 109, and the updater 107 further receives a statistical information set from the memory 109, wherein the statistical information set is an aggregated value set, and each signal value of the signal value set corresponds to an aggregated value of the aggregated value set. After the checker 105 receives the plurality of input signal values and the signal value set, the checker 105 checks whether each input signal value of the plurality of input signal values belongs to the signal value set and generates a check result. When the check result is the each input signal value belonging to the signal value set, the updater 107 adds an input aggregated value corresponding to the each input signal value (that is, a current input aggregated value) to an aggregated value corresponding to the each input signal value, wherein the aggregated value corresponding to the each input signal value is included in the aggregated value set. When the check result is the each input signal value not belonging to the signal value set, the checker 105 takes the each input signal value as a new signal value, and inserts the new signal value into the signal value set. Meanwhile, the updater 107 takes an input aggregated value corresponding to the new signal value as a new aggregated value, and inserts the new aggregated value into the aggregated value set.

Figure 7A:
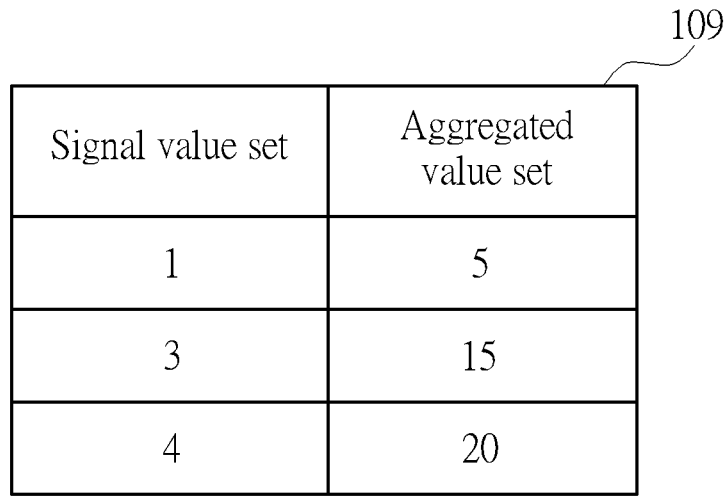
FIGS. 7A, 7B are diagrams illustrating operation methods of the checker and the updater.
Figure 7B:
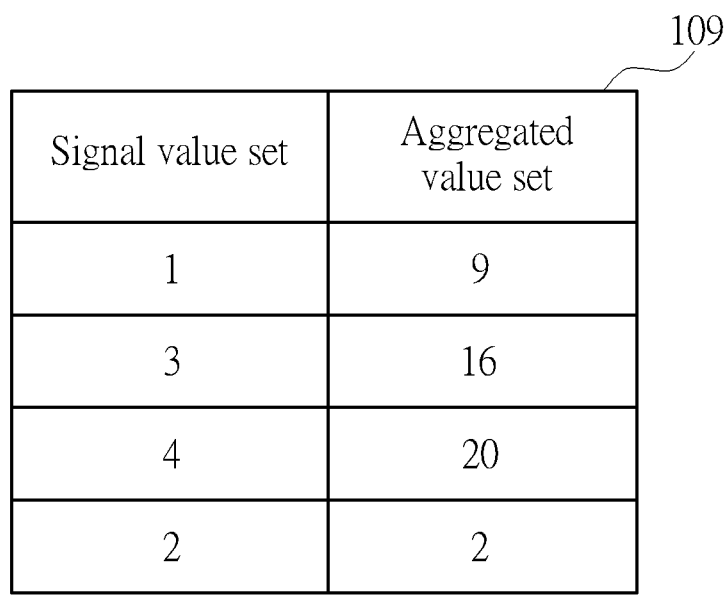

However, in another embodiment of the present invention, because the preprocessor 101 and the weight processor 103 batchwise generate the plurality of input signal values and the plurality of input aggregated values according to the predetermined order, the checker 105 and the updater 107 can batchwise operate according to the predetermined order. That is, the checker 105 and the updater 107 can receive a part of the plurality of input signal values (that is, input signal values corresponding to the each block) and a part of the plurality of input aggregated values (that is, input aggregated values corresponding to the each block). Please refer to FIGS. 7A-7B. FIGS. 7A-7B are diagrams illustrating operation methods of the checker 105 and the updater 107. In an example shown in FIG. 7A, when the checker 105 and the updater 107 receives the part of the plurality of input signal values and the part of the plurality of input aggregated values in a batch, the signal value set of the memory 109 includes signal values 1, 3, 4, and the aggregated value set of the memory 109 includes aggregated values 5, 15, 20, corresponding to the signal values 1, 3, 4, respectively. Meanwhile, the part of the plurality of input signal values and the part of the plurality of input aggregated values are the input signal values 1, 3, 2 and corresponding input aggregated values 4, 1, 2 as shown in FIG. 3C. Then, the checker 105 can check whether the input signal value 1 belongs to the signal value set shown in FIG. 7A. Because the input signal value 1 belongs to the signal value set, the updater 107 adds the input aggregated value 4 (corresponding to the input signal value 1 as shown in FIG. 3C) to the aggregated value 5 (corresponding to the signal value 1 as shown in FIG. 7A) of the aggregated value set. Therefore, the aggregated value 5 would be updated to 9 (as shown in FIG. 7B). Similarly, the updater 107 also can add the input aggregated value 1 (corresponding to the input signal value 3 as shown in FIG. 3C) to the aggregated value 15 (corresponding to the signal value 3 as shown in FIG. 7A) of the aggregated value set. Therefore, the aggregated value 15 would be updated to 16 (as shown in FIG. 7B). In addition, the checker 105 can check whether the input signal value 2 belongs to the signal value set. Because the input signal value 2 does not belong to the signal value set, the checker 105 inserts the input signal value 2 into the signal value set as a new signal value 2, and the updater 107 inserts a new aggregated value 2 corresponding into the new signal value 2 to the aggregated value set (as shown in FIG. 7B).

Figure 8A:
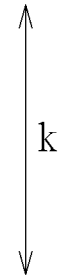
FIGS. 8A, 8B are diagrams illustrating the signal value set including at most the predetermined amount of signal values.
Figure 8B:
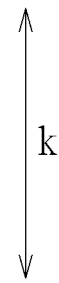

In addition, in another embodiment of the present invention, the signal value set saved in the memory 109 includes at most a predetermined value k of signal values. That is, when the signal value set of the memory 109 is less than the predetermined value k, the checker 105 and the updater 107 can operate according to the above-mentioned descriptions; and when a number of signal values in the signal value set equals to the predetermined value k, the checker 105 stops inserting the new signal value, and the updater 107 stops inserting the new aggregated value corresponding into the new signal value. However, the updater 107 still can update the aggregated value set according to each check result of remaining batches. Please refer to FIGS. 8A, 8B. FIGS. 8A, 8B are diagrams illustrating the signal value set including at most the predetermined value k of signal values. As shown in FIG. 8A, the signal value set includes the signal values 1, 3, 4, and the predetermined value k is 3. As shown in FIG. 8B, when the checker 105 receives the input signal values 1, 3, 2 as shown in FIG. 3C and the updater 107 receives the input aggregated values 4, 1, 2 corresponding to the input signal values 1, 3, 2, respectively, the checker 105 and the updater 107 can update the aggregated values (included in the aggregated value set) corresponding to the signal values 1, 3 according to the above-mentioned description of the checker 105 and the updater 107. However, because the number of the signal values in the signal value set equals to the predetermined value k, the checker 105 would not insert the new signal value 2 into the signal value set, and the updater 107 would not insert the new aggregated value 2 corresponding into the new signal value 2 to the aggregated value set. In addition, when operations of the checker 105 and the updater 107 in the remaining batches is completed, the signal value set of and the aggregated value set of the memory 109 can be used for outputting an output value.

In addition, in another embodiment of the present invention, when the number of the signal values in the signal value set equals to the predetermined value k, the checker 105 can further generate a compare result, wherein the compare result is used for indicating a minimum aggregated value of the aggregated value set. The checker 105 optionally replaces a signal value of the signal value set according to the compare result and the each check result of the remaining batches, and the updater 107 can correspondingly replace a corresponding aggregated value of the aggregated value set. For example, when the number of the signal values in the signal value set equals to the predetermined value k, the checker 105 can delete a signal value corresponding to a minimum aggregated value from the signal value set, the updater 107 can delete the minimum aggregated value from the aggregated value set, and the checker 105 and the updater 107 can insert the new signal value and the new aggregated value into the signal value set and the aggregated value set, respectively. However, in another of the present invention, the compare result also can be used for indicating a minimum aggregated value of the aggregated value set and the current input aggregated value. When the minimum aggregated value belongs to the aggregated value set, the checker 105 and the updater 107 can replace the signal value of the signal value set and the corresponding aggregated value of the aggregated value set according to the above-mentioned operations. In addition, when the operations of the checker 105 and the updater 107 in the remaining batches is completed, the signal value set of and the aggregated value set of the memory 109 can be used for outputting the output value.

In addition, in another embodiment of the present invention, when the number of the signal values in the signal value set equals to the predetermined value k, the checker 105 and the updater 107 completely stops operating. That is, the updater 107 stops updating the aggregated value set according to the each check result of the remaining batches. Therefore, the memory 109 remains the same as a status of the memory 109 when the number of the signal values in the signal value set equals to the predetermined value k; and the memory 109 can be used for outputting the output value.

In addition, in another embodiment of the present invention, the memory 109 is used for saving a trace set and the statistical information set, and the checker 105 and the updater 107 generates the check result according to the part of the plurality of input signal values and the trace set in the each batch, wherein the trace set can be the signal value set, or an index set for matching the statistical information set to the signal value set. For example, when the trace set is the index set for matching the statistical information set to the signal value set, each index of the index set is used for indicating a memory address of statistical information corresponding to the each signal value in memory 109. In addition, when the memory 109 is used for saving a trace set and the statistical information set, operation methods of the checker 105 and the updater 107 can be referred to the above-mentioned descriptions of the checker 105 and the updater 107, so further description thereof is omitted for simplicity.

In addition, when the signal values of the plurality of pixels is represented by N bits, the signal values of the plurality of pixels has $2^N$ possible signal values. However, because the memory 109 does not save all possible signal values, a number of signal values in the updated signal value set of the memory 109 is less than $2^N$. In addition, because the signal value set saved in the memory 109 includes at most the predetermined value k of signal values, the number of the signal values in the updated signal value set of the memory 109 is less than or equal to M.

In addition, as shown in FIG. 1, the memory 109 is coupled to the checker 105 and the updater 107, and the memory 109 includes a signal value memory block and an aggregated value memory block, wherein the signal value memory block saves the signal value set and the aggregated value memory block saves the aggregated value set. In addition, the digital filter 100 further includes an output processor 111 coupled to the memory 109. After the signal value set and the aggregated value set become the updated signal value set and the updated aggregated value set through the above-mentioned operation methods of the checker 105 and the updater 107, the output processor 111 can output a corresponding signal value (that is, the output value) from the updated signal value set to the target pixel TP according to a maximum aggregated value of the updated aggregated value set. For example, when the updated signal value set and the updated aggregated value set are as shown in FIG. 7B, the output processor 111 can output the signal value 4 corresponding to the aggregated value 20 to replace an original signal value of the target pixel TP. But, in another embodiment of the present invention, when the number of the signal values in the signal value set equals to the predetermined value k, both the checker 105 and the updater 107 stop operating. Therefore, when the number of the signal values in the signal value set equals to the predetermined value k, the output processor 111 directly outputs the corresponding signal value to the target pixel TP according to the above-mentioned operation method of the output processor 111. In addition, in another embodiment of the present invention, the output processor 111 calculates an aggregated average value according to the updated signal value set and the updated aggregated value set, takes the aggregated average value as the corresponding signal value, and outputs the corresponding signal value to the target pixel TP. For example, when the updated signal value set and the updated aggregated value set are as shown in FIG. 7B, the output processor 111 can calculate the aggregated average value as $$\frac{9 \times 1 + 16 \times 3 + 20 \times 4 + 2 \times 2}{9 + 16 + 20 + 2} = 3$$

according to the signal values 1, 3, 4, 2 and the aggregated values 9, 16, 20, 2. Therefore, the aggregated average value 3 can be outputted as the output value to replace the original signal value of the target pixel TP.

In addition, those of ordinary skill in the art should clearly realize functions of the preprocessor 101, the weight processor 103, the checker 105, the updater 107, and the output processor 111 through the above-mentioned corresponding descriptions of the preprocessor 101, the weight processor 103, the checker 105, the updater 107, and the output processor 111, so those of ordinary skill in the art can easily implement the preprocessor 101, the weight processor 103, the checker 105, the updater 107, and the output processor 111 through a field programmable gate array (FPGA) with the above-mentioned functions of the preprocessor 101, the weight processor 103, the checker 105, the updater 107, and the output processor 111, or an application-specific integrated circuit (ASIC) with the above-mentioned functions of the preprocessor 101, the weight processor 103, the checker 105, the updater 107, and the output processor 111, or a software module with the above-mentioned functions of the preprocessor 101, the weight processor 103, the checker 105, the updater 107, and the output processor 111, or an analog integrated circuit with the above-mentioned functions of the preprocessor 101, the weight processor 103, the checker 105, the updater 107, and the output processor 111. Therefore, further description of corresponding structures of the preprocessor 101, the weight processor 103, the checker 105, the updater 107, and the output processor 111 is omitted for simplicity.

Figure 9:
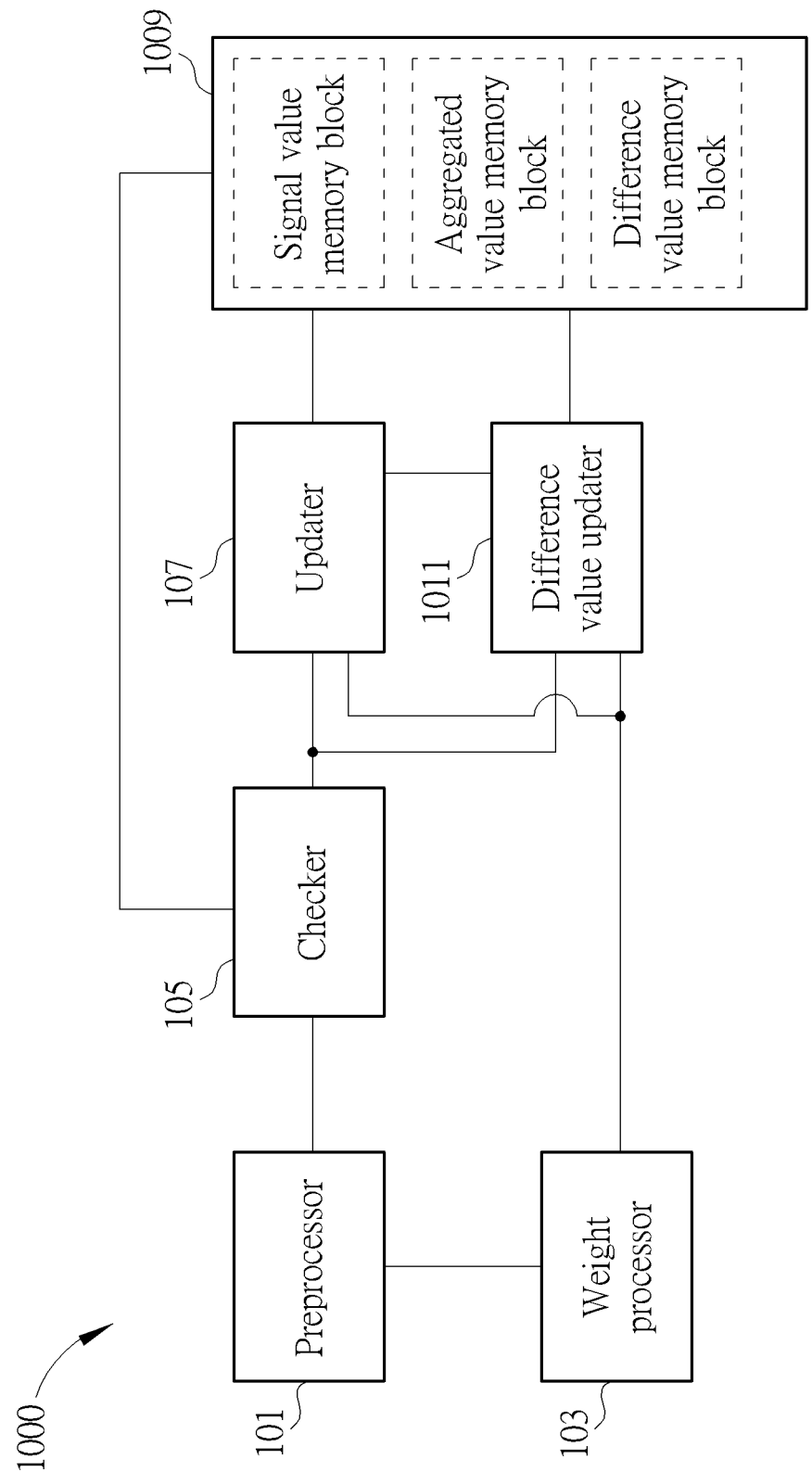
FIG. 9 is a diagram illustrating a digital filter for filtering signals according to a second embodiment of the present invention.

Please refer to FIG. 9. FIG. 9 is a diagram illustrating a digital filter 1000 for filtering signals according to a second embodiment of the present invention. As shown in FIG. 9, differences between the digital filter 1000 and the digital filter 100 are that the digital filter 1000 further includes a difference value updater 1011, and the digital filter 1000 further utilizes a memory 1009 to replace the memory 109, wherein the memory 1009 is used for saving the signal value set and the statistical information set, and the statistical information set includes the aggregated value set and a difference value set. But, in another embodiment of the present invention, difference value updater 1011, the checker 105, and the updater 107 can be integrated to the processer. In addition, the memory 1009 further includes a difference value memory block, and the difference value memory block is used for saving the difference value set. The difference value updater 1011 is coupled to the weight processor 103, the checker 105 and the updater 107, and receives the difference value set from the memory 1009, wherein each signal value of the signal value set corresponds to a difference value of the difference value set. In addition, the difference value updater 1011 further receives the plurality of input signal values from the checker 105, and receives the plurality of input aggregated values from the weight processor 103. But, in another embodiment of the present invention, the difference value updater 1011 is further coupled to the preprocessor 101, and the difference value updater 1011 receives the plurality of input signal values from the preprocessor 101.

Figure 10A:
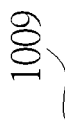

The difference value updater 1011 compares the each input signal value with the each signal value of the signal value set, respectively. When the each input signal value is greater than the each signal value, the difference value updater 1011 adds an input aggregated value corresponding to the each input signal value to a difference value corresponding to the each signal value, wherein the difference value corresponding to the each signal value is included in the difference value set. When the each input signal value is less than the each signal value, the difference value updater 1011 subtracts the input aggregated value corresponding to the each input signal value from the difference value corresponding to the each signal value. In addition, when the each input signal value does not belong to the signal value set, the difference value updater 1011 compares the each input signal value with the each signal value, and further generates a new difference value corresponding to the new signal value according to a comparing result of the difference value updater 1011 and an aggregated value corresponding to the each signal value. Please refer to FIGS. 10A-10C. FIGS. 10A-10C are diagrams illustrating an operation method of the difference value updater 1011, wherein FIG. 10A is illustrated according to FIG. 7A. Therefore, the signal value set shown in FIG. 10A is the same as the signal value set shown in FIG. 7A. As shown in FIG. 10A, the memory 1009 further saves the difference value set, wherein the difference value set includes difference values 35, 15, −20, wherein the difference values 35, 15, −20 correspond to the signal values 1, 3, 4, respectively.

Please refer to FIGS. 3C, 10B, wherein the signal value set and the aggregated value set shown in FIG. 10B are updated according to operation methods of the checker 105 and the updater 107 shown in FIGS. 7A-7B, so further description thereof is omitted for simplicity. In addition, when the difference value updater 1011 receives the input signal values 1, 3, 2 and the input aggregated values 4, 1, 2 corresponding to the input signal values 1, 3, 2 as shown in FIG. 3C, the difference value updater 1011 can compare each of the input signal values 1, 3, 2 with each of the signal values 1, 3, 4, respectively. When the difference value updater 1011 compares the input signal value 1 with the each of the signal values 1, 3, 4, an operation method of the difference value updater 1011 can be referred to a dashed square "corresponding to input signal value 1" shown in FIG. 10B. As shown in FIG. 10B, when the difference value updater 1011 compares the input signal value 1 with the signal value 1, because the input signal value 1 equals to the signal value 1, the difference value updater 1011 does not execute further operation. When the difference value updater 1011 compares the input signal value 1 with the signal value 3, because the input signal value 1 is less than the signal value 3, the difference value updater 1011 subtracts the input aggregated value 4 corresponding to the input signal value 1 from the difference value 15 corresponding to the signal value 3. When the difference value updater 1011 compares the input signal value 1 with the signal value 4, because the input signal value 1 is less than the signal value 4, the difference value updater 1011 subtracts the input aggregated value 4 corresponding to the input signal value 1 from the difference value −20 corresponding to the signal value 4.

In addition, when the difference value updater 1011 compares the input signal value 3 with the each of the signal values 1, 3, 4, the operation method of the difference value updater 1011 can be referred to a dashed square "corresponding to input signal value 3" shown in FIG. 10B. When the difference value updater 1011 compares the input signal value 3 with the signal value 1, because the input signal value 3 is greater than the signal value 1, the difference value updater 1011 adds the input aggregated value 1 corresponding to the input signal value 3 to the difference value 35 corresponding to the signal value 1. When the difference value updater 1011 compares the input signal value 3 with the signal value 3, because the input signal value 3 equals to the signal value 3, the difference value updater 1011 does not execute further operation. When the difference value updater 1011 compares the input signal value 3 with the signal value 4, because the input signal value 3 is less than the signal value 4, the difference value updater 1011 subtracts the input aggregated value 1 corresponding to the input signal value 3 from the difference value −20 corresponding to the signal value 4.

Similarly, when the difference value updater 1011 compares the input signal value 2 with the each of the signal values 1, 3, 4, the operation method of the difference value updater 1011 can be referred to a dashed square "corresponding to input signal value 2" shown in FIG. 10B, and further description thereof is omitted for simplicity. In addition, because the input signal value 2 does not belong to the signal value set, the difference value updater 1011 further inserts a new difference value corresponding to the new signal value 2 into the difference value set according to the input signal value 2 and the signal values 1, 3, 4 of the signal value set. Because the input signal value 2 is greater than the signal value 1, less than the signal value 3, and less than the signal value 4, the difference value updater 1011 adds values −9, +16, and +20 according to the aggregated value 9 corresponding to the signal value 1, the aggregated value 16 corresponding to the signal value 3, and the aggregated value 20 corresponding to the signal value 4, respectively. Therefore, the difference value updater 1011 can insert a new difference value 27 corresponding to the new signal value 2.

Please refer to FIG. 10C. After the difference value updater 1011 updates the difference value set or inserts the new difference value into the difference value set according to the above-mentioned operation method of the difference value updater 1011, the memory 1009 saves the updated signal value set, the updated aggregated value set, and the updated difference value set as shown in FIG. 10C. In addition, the digital filter 1000 further includes an output processor (does not shown in FIG. 9); the output processor is couple to the memory 1009. When the number of the data received by the preprocessor 101 equals to the size of the input window IW, the output processor outputs the corresponding signal value from the updated signal value set to the target pixel TP according to a difference value of the updated difference value set closest to zero. For example, when the updated signal value set and the updated difference value set are as shown in FIG. 10C, the output processor can output the signal value 3 corresponding to the difference value 9 to replace the original signal value of the target pixel TP, wherein the difference value 9 of the updated difference value set is a difference value closest to zero.

In addition, those of ordinary skill in the art should clearly realize functions of the difference value updater 1011 through the above-mentioned corresponding descriptions of the difference value updater 1011, so those of ordinary skill in the art can easily implement the difference value updater 1011 through a field programmable gate array (FPGA) with the above-mentioned functions of the difference value updater 1011, or an application-specific integrated circuit (ASIC) with the above-mentioned functions of the difference value updater 1011, or a software module with the above-mentioned functions of the difference value updater 1011, or an analog integrated circuit with the above-mentioned functions of the difference value updater 1011. Therefore, further description of corresponding structures of the difference value updater 1011 is omitted for simplicity.

Figure 11:
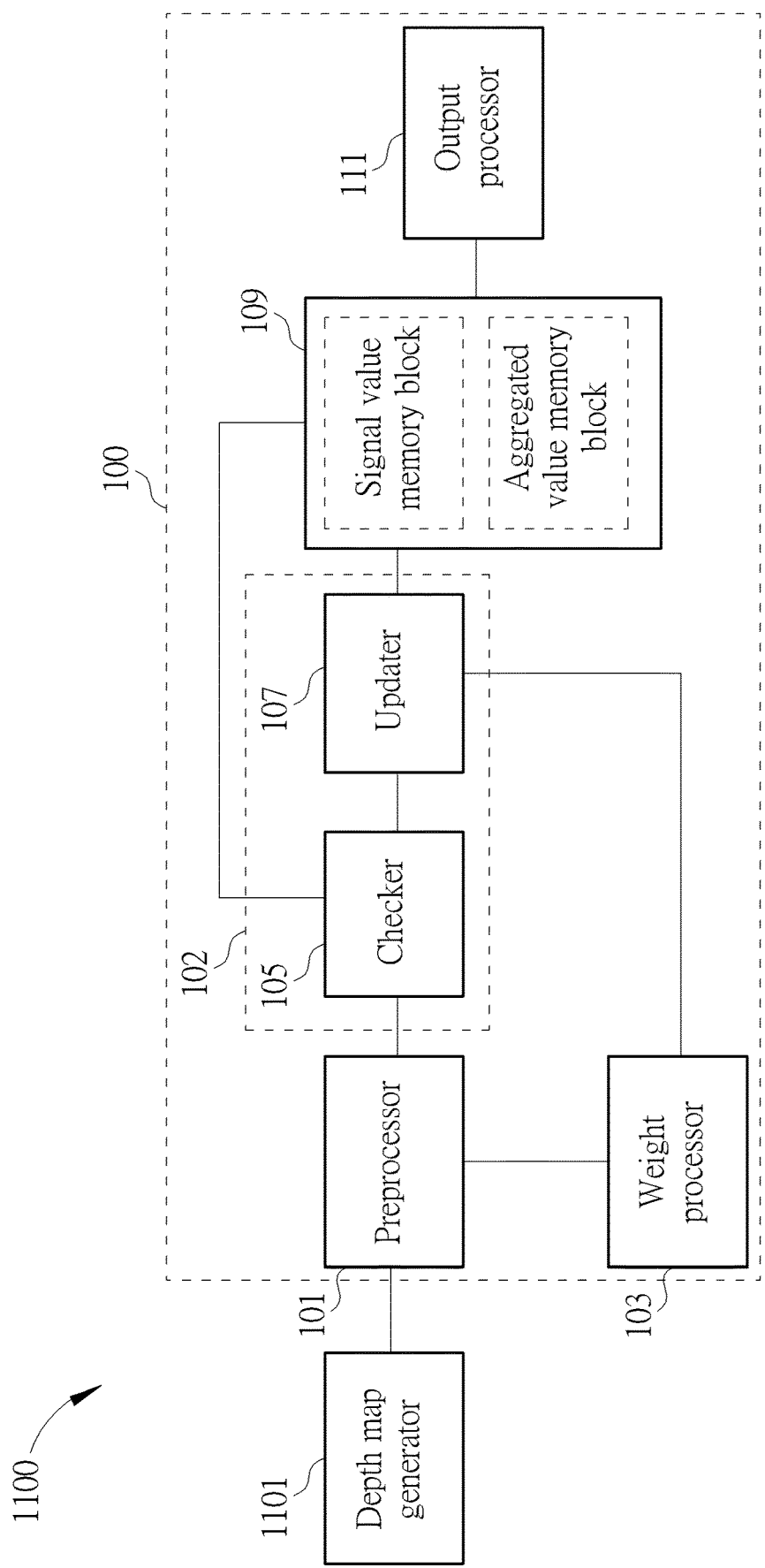
FIG. 11 is a diagram illustrating a filter system according to a third embodiment of the present invention.

Please refer to FIG. 11. FIG. 11 is a diagram illustrating a filter system 1100 according to a third embodiment of the present invention. As shown in FIG. 11, the filter system 1100 includes a depth map generator 1101 and the digital filter 100, wherein the digital filter 100 is coupled to the depth map generator 1101. The depth map generator 1101 generates the depth map DI according to a left-eye image and a right-eye image. In addition, the digital filter 100 can utilize the preprocessor 101 to receive the depth map DI and the left-eye image or the right-eye image from the depth map generator 1101. When the depth map DI is a low quality depth map or a depth map with holes, certain pixels of the depth map DI do not have the signal values. Meanwhile, the preprocessor 101 can take the left-eye image or the right-eye image as a reference and generate signal values corresponding to the certain pixels according to surrounding pixels of the certain pixels, such that holes of the depth map are filled. In addition, further operation methods of the digital filter 100 can be referred to the above-mentioned descriptions of the digital filter 100, so further description thereof is omitted for simplicity. In addition, the depth map generator calculating the disparity between the left-eye image and the right-eye image to generate the depth map DI and a structure of the depth map generator are well-known to those of ordinary skill in the art, so further description thereof is omitted for simplicity.

To sum up, because a memory included in the digital filter provided by the present invention utilizes a signal value set and an aggregated value set of at least one statistical information set corresponding to the signal value set to save a signal value and an aggregated value of each datum of an input window corresponding to a target datum, the present invention can enhance saving efficiency of the memory. In addition, because the at least one statistical information set further includes a difference value set, the present invention can calculate and output a corresponding signal value to replace an original signal value of the target datum according to the signal value set and one of the aggregated value set and the difference value set. Therefore, the digital filter not only provides different filter effect, but also enhances saving efficiency of the memory.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A digital filter for filtering signals comprising:
    a processer receiving M input signal values and M input aggregated values corresponding to the M input signal values, wherein M is a positive integer, and each input aggregated value of the M input aggregated values corresponds to weights of pixels having a corresponding input signal value of the M input signal values;
    a memory coupled to the processer for saving a signal value set and a statistical information set;
    wherein the processer determines whether to update the signal value set and the statistical information set according to the M input signal values and the M input aggregated values, and generates an output value according to the updated signal value set and the updated statistical information set;
    wherein a number of signal values in the updated signal value set is less than M.

2. The digital filter of claim 1, wherein the statistical information set comprises an aggregated value set, and each aggregated value of the aggregated value set corresponds to a signal value of the signal value set.

3. The digital filter of claim 2, wherein the processer determining whether to update the signal value set and the statistical information set is the processer checking whether each input signal value of the M input signal values belongs to the signal value set;
    wherein when the each input signal value belongs to the signal value set, the processer adds an input aggregated value corresponding to the each input signal value to an aggregated value corresponding to the each input signal value of the aggregated value set;
    wherein when the each input signal value does not belong to the signal value set, the processer inserts the each input signal value into the signal value set, and the processer inserts the input aggregated value corresponding into the each input signal value to the aggregated value set.

4. The digital filter of claim 3, wherein the statistical information set further comprises a difference value set, each difference value of the difference value set corresponds to a signal value of the signal value set, and the processer determining whether to update the signal value set and the statistical information set further comprises:
    the processer comparing the each input signal value and each signal value of the signal value set, respectively, wherein when the each input signal value is greater than the each signal value, the processer adds the input aggregated value corresponding to the each input signal value to a difference value corresponding to the each signal value of the difference value set; and when the each input signal value is less than the each signal value, the processer subtracts the input aggregated value corresponding to the each input signal value from the difference value corresponding to the each signal value.

5. The digital filter of claim 4, wherein when the each input signal value does not belong to the signal value set, the processer further compares the each input signal value with the each signal value, and generates a new difference value corresponding to the each input signal value according to a comparing result of the processer and an aggregated value corresponding to the each signal value.

6. The digital filter of claim 5, further comprising:
    an output processor generating the output value from the updated signal value set according to a difference value closest to zero of a difference value set of the updated statistical information set.

7. The digital filter of claim 2, further comprising:
    an output processor generating the output value from the updated signal value set according to a maximum aggregated value of an aggregated value set of the updated statistical information set, or calculating an aggregated average value according to the updated signal value set and the aggregated value set of the updated statistical information set and taking the aggregated average value as the output value.

8. The digital filter of claim 2, further comprising:
    a preprocessor receiving L data corresponding to an input window of the signal and deciding L weights corresponding to the L data, wherein each data of the L data has a signal value, the preprocessor scans the L data in order, generates the M input signal values in order according to signal values of the L data, and generates the M input aggregated values correspondingly according to the M input signal values and the L weights, wherein L is a positive integer, and M is not greater than L.

9. The digital filter of claim 8, wherein the preprocessor scanning the L data in order is the preprocessor starting to scan the L data from a target datum corresponding to the input window according to a non-raster scan order.

10. A digital filter for filtering signals comprising:
    a processer receiving M input signal values and M input aggregated values corresponding to the M input signal values, wherein each input signal values is an N-bits data, M, N are positive integers, and each input aggregated value of the M input aggregated values corresponds to weights of pixels having a corresponding input signal value of the M input signal values;
    a memory coupled to the processer for saving a signal value set and a statistical information set;
    wherein the processer determines whether to update the signal value set and the statistical information set according to the M input signal values and the M input aggregated values, and generates an output value according to the updated signal value set and the updated statistical information set;

wherein a number of signal values in the updated signal value set is less than $2^N$, and the number is less than or equal to M.

\* \* \* \* \*